(12) United States Patent
Lenner et al.

(10) Patent No.: US 10,228,275 B2
(45) Date of Patent: *Mar. 12, 2019

(54) SYSTEM AND METHOD FOR NON-INTRUSIVE AND CONTINUOUS LEVEL MEASUREMENT IN A CYLINDRICAL VESSEL

(71) Applicant: ABB Schweiz AG, Zürich (CH)

(72) Inventors: Miklos Lenner, Baden-Dättwil (CH); Tobias Kaufmann, Zürich (CH); Detlef Pape, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 107 days.

This patent is subject to a terminal disclaimer.

(21) Appl. No.: 15/202,165

(22) Filed: Jul. 5, 2016

(65) Prior Publication Data

US 2017/0010145 A1    Jan. 12, 2017

(30) Foreign Application Priority Data

Jul. 6, 2015 (EP) .................................... 15002014
Nov. 23, 2015 (EP) .................................... 15195850

(51) Int. Cl.
*G01F 23/296* (2006.01)
*G01F 25/00* (2006.01)
(Continued)

(52) U.S. Cl.
CPC ...... *G01F 23/2962* (2013.01); *G01F 25/0061* (2013.01); *G01S 7/539* (2013.01); *G01S 15/101* (2013.01); *G01S 7/527* (2013.01)

(58) Field of Classification Search
CPC .. G01F 23/2962; G01F 25/0061; G01S 7/539; G01S 15/101; G01S 7/527
(Continued)

(56) References Cited

U.S. PATENT DOCUMENTS

| 4,954,997 A | 9/1990 | Dieulesaint et al. |
| 5,793,705 A * | 8/1998 | Gazis .................. G01F 23/296 |
| | | 367/98 |

(Continued)

FOREIGN PATENT DOCUMENTS

| DE | 68903015 T2 | 5/1993 | |
| JP | 2000346695 A * | 12/2000 | ........... G01F 23/296 |

(Continued)

OTHER PUBLICATIONS

Translation JP 2000346695 A, Dec. 2000.*

*Primary Examiner* — Natalie Huls
*Assistant Examiner* — Monica S Young
(74) *Attorney, Agent, or Firm* — J. Bruce Schelkopf; Taft Stettinius & Hollister LLP

(57) ABSTRACT

An application relates to a system and a method for non-intrusive and continuous level measurement in a cylindrical vessel. The system comprises an ultrasonic transducer for generating an ultrasound wave and for emitting it into the vessel wall, and an electronic control and data processing unit (ECDP) for controlling operation of the transducer and for determining the liquid level from a time of flight of the ultrasound wave. The transducer emits the ultrasound wave as a primary Lamb wave into the vessel wall so that a part of the primary Lamb wave leaks into the liquid. The ECDP changes the ultrasonic frequency of the transducer until the transducer receives a reflection of the emitted ultrasound wave in form of a reflection of the pressure wave, determine the corresponding time of flight, and determine the liquid level from the time of flight and from parameters of the ultrasound waves.

14 Claims, 3 Drawing Sheets

Figure 2:
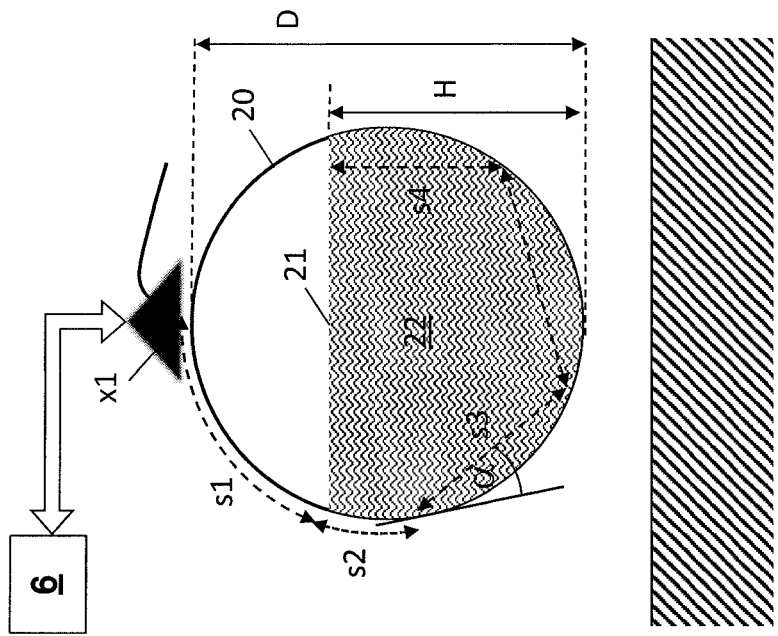

(51) Int. Cl.
  *G01S 7/539* (2006.01)
  *G01S 15/10* (2006.01)
  *G01S 7/527* (2006.01)
(58) Field of Classification Search
  USPC .......................................................... 73/29
  See application file for complete search history.

(56) References Cited

U.S. PATENT DOCUMENTS

| | | | | |
|---|---|---|---|---|
| 6,053,041 | A * | 4/2000 | Sinha | G01F 23/28 340/621 |
| 6,324,907 | B1 * | 12/2001 | Halteren | H04R 19/005 310/334 |
| 6,925,870 | B2 | 8/2005 | Pappas et al. | |
| 7,694,560 | B1 | 4/2010 | Dam et al. | |
| 2001/0006318 | A1 * | 7/2001 | Getman | G10K 11/36 310/313 R |
| 2009/0078049 | A1 * | 3/2009 | Sinha | G01N 29/02 73/623 |
| 2010/0242593 | A1 * | 9/2010 | Lagergren | G01D 5/48 73/290 V |

FOREIGN PATENT DOCUMENTS

| | | |
|---|---|---|
| JP | 2006322825 A | 11/2006 |
| RU | 2112221 C1 | 5/1998 |

* cited by examiner

SYSTEM AND METHOD FOR NON-INTRUSIVE AND CONTINUOUS LEVEL MEASUREMENT IN A CYLINDRICAL VESSEL

The invention relates to a system and a method for non-intrusive and continuous level measurement in a cylindrical vessel.

Level sensors are used to determine the filling level of a vessel containing a liquid, wherein one type of vessel commonly used is a horizontally lying, cylindrical tank in is which the liquid may be both stored and/or transported.

Today, level measurement methods mainly apply an intrusive technique which means that an opening in the wall of the vessel is needed to introduce the level sensor into the vessel.

However, in certain industries, such as in the food or pharmaceutical industry, it is undesirable to bring a foreign object into close proximity of or even contact with the liquid, in order to avoid contamination. In even other areas, such as in the chemical or in the oil and gas industry, intrusive level measurement may not be indicated due to the liquids being explosive, easily inflammable, corrosive or being subject to extreme temperatures.

Accordingly, in the past, non-intrusive measurement techniques were developed for measuring the filling level of an unopened vessel. Such non-intrusive sensors may for example be based on X-ray or gamma-ray technology. Since the use of X- or gamma-rays is connected to certain dangers and is therefore not only potentially harmful but also expensive, it is usually applied only if no alternatives exist.

Alternatives are available in the form of acoustic non-intrusive methods. From U.S. Pat. No. 7,694,560B1 and US20100242593A1, ultrasonic level sensors are known where an acoustic signal is sent from underneath the bottom of the vessel towards the level interface and is reflected back the same way. The term "level interface" refers to the surface of the liquid. The ultrasonic signal sent out by these sensors passes directly through the wall of the vessel to enter and to pass the liquid in a straight path in vertical direction. The disadvantage of the measurement methods of U.S. Pat. No. 7,694,560B1 and US20100242593A1 lies in that they require access to the bottom of the vessel or tank, which is often not given in industrial applications.

Figure 1:
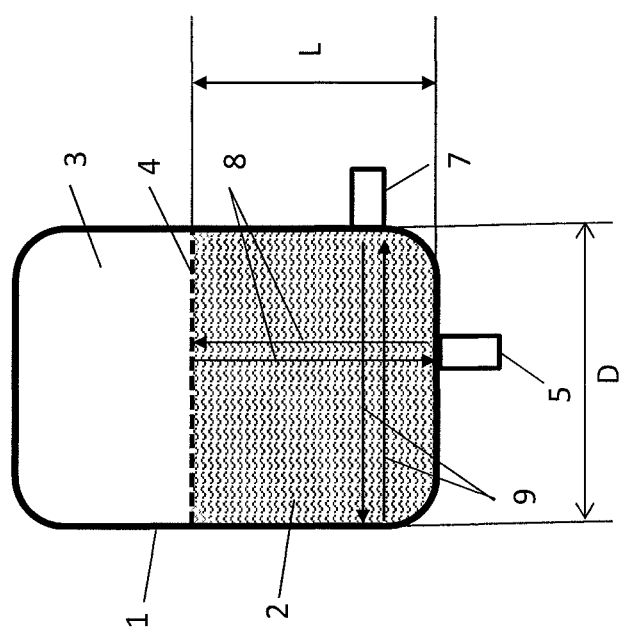

In JP2006322825A, a non-intrusive liquid level measuring method is described which applies above described level measuring technique. The general setup is shown in FIG. 1. Here, a vessel 1 contains a liquid 2 and a gaseous medium 3 above the liquid 4. The interface between the liquid 2 and the gaseous medium 3 is called liquid surface 4 or level interface. The time of flight of an ultrasonic pulse 8 is measured, where the ultrasonic pulse 8 is transmitted from the outside of the bottom of the vessel 1 by a first ultrasonic transmitter-receiver 5 and reflected back by the liquid surface 4. In order to calculate the filling level of liquid 2, the propagation speed of the ultrasonic wave, i.e. its speed of sound in the liquid 2, is needed. The speed of sound is determined by a second ultrasonic transmitter-receiver 7 which is positioned at a side wall of the tank and which measures the time of flight of a second pulse 9 along the horizontal diameter of the vessel 1. It is required in JP2006322825A that the diameter of the vessel 1 is a known magnitude, so that the speed of sound of the ultrasonic pulse 9 is calculated directly.

In other words, in FIG. 1, an acoustic signal 8 is sent towards the level interface or liquid surface 4, where it is reflected back and then received by the same transducer 5. The time of flight t of the acoustic signal 8 is measured. The distance L from the transducer 5 to the liquid surface 4, and thereby the liquid level, is then calculated by multiplying the propagation speed c_medium of the signal in the liquid 2, which is for acoustical signals the speed of sound, with half the time of flight t, i.e.

$$L = (t * c\_medium)/2 \qquad (1).$$

Another non-intrusive solution which is based on the usage of ultrasonic signals directly emitted into the liquid is proposed in U.S. Pat. No. 6,925,870B2. There, a transmitter-receiver is located at the side wall of the vessel. One ultrasonic signal is emitted in horizontal direction and reflected back from the opposite side wall of the vessel. This signal is used for measuring the speed of sound, i.e. the travel speed of the ultrasonic beam, in the liquid. Another ultrasonic signal is emitted in an angular direction in such a way that it is reflected back by the intersection between the liquid surface and the opposite side wall of the vessel. From the time of flight of this second signal, the height of the liquid surface relative to the location of the transducer is determined.

A prerequisite for the method of U.S. Pat. No. 6,925,870B2 to work is that the liquid surface, i.e. the level interface, and the vessel wall describe a rectangular corner. In other words, the method is only applicable to vessels with vertical walls. For non-vertically aligned walls, the ultrasonic signal would not be reflected back to the transmitter but to a different position, depending on the angle of the transmitted beam and the angle of the wall.

A different technology for non-intrusive liquid level measurements is described in DE68903015T2, RU2112221C1 and Sakharov et. al., "Liquid level sensor using ultrasonic Lamb waves", Ultrasonics 41 (2003), pp. 319-322. The technology described there is based on the use of ultrasonic Lamb waves propagating along the vessel wall or walls, and is not applicable for continuous measurement of the level height, but instead for detecting whether a predefined level is exceeded by the liquid surface or not. Further, in contrast to the ultrasonic sensors described previously, where the ultrasonic signal is emitted directly into the liquid, the ultrasonic Lamb waves are generated and kept to a large degree inside the wall surrounding the liquid. In other words, while the directly emitted and reflected ultrasonic signals are used by continuous level sensors, the ultrasonic Lamb waves travelling inside the vessel wall are used by point level sensors. Even further, while in the continuous level sensors the ultrasonic signal is reflected back immediately after having propagated through the liquid so that transmitter and receiver are placed at the same position outside of the vessel wall, the Lamb wave sensors have a pair of transmitter and corresponding receiver placed at the same height but at different horizontal positions.

Figure 4:
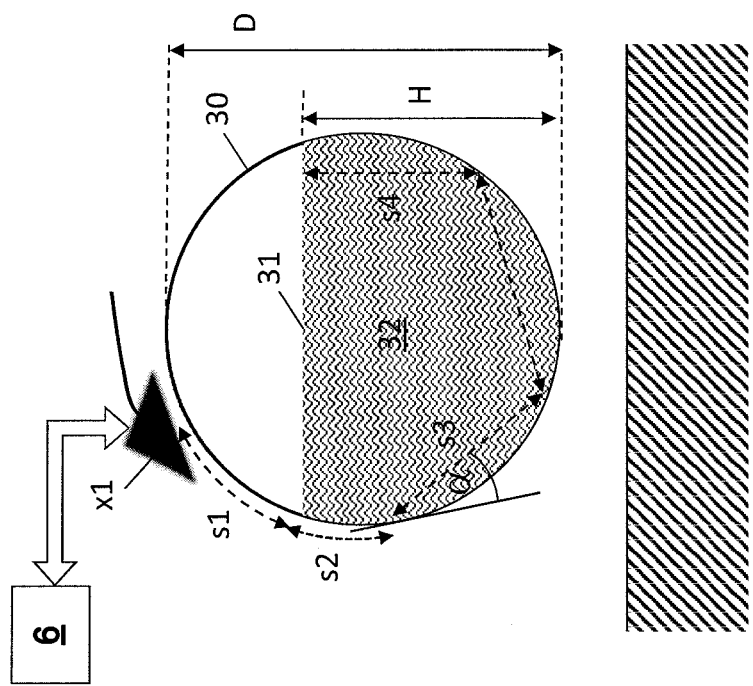

Lamb waves or also called plate waves are mechanical waves generated in plates where the wave propagation is influenced by the reflection of the wave at the sides of the walls and the thus limited propagation space. They thus show similar properties as waves propagating in wave guides. Lamb waves are propagating in different modes with different properties, in particular different propagation velocities as well as different attenuations. Typically at low frequencies, a symmetric S0 and an anti-symmetric A0 mode can occur, as is depicted in FIG. 4. Ideally, the waves are reflected totally at the sides of the plate and are thus kept inside the plate. This is valid in a first approximation for plates in a gaseous medium or in vacuum.

In the case of a contact of the plate with a liquid, the reflectivity of the interface is reduced and the Lamb waves can emit acoustic energy into the surrounding liquid medium. This occurs especially for the asymmetric mode at low frequencies. Due to the emitting of acoustic energy into the surrounding medium, they are also called leaky Lamb waves. This emitting of acoustic energy into the liquid results in a strong attenuation of the wave, which effect is especially used in the point level sensors of DE68903015T2, RU2112221C1 and Sakharov for the detection of the presence of liquid.

While the point level sensors of DE68903015T2 and Sakharov are purely based on Lamb waves travelling inside the vessel walls, the point level sensor of RU2112221C1 emits both a Lamb wave into the vessel wall and a longitudinal ultra-sound wave into the liquid. Both waves propagate horizontally and in parallel to the liquid surface. By measuring the attenuation of the two signals, a more reliable and accurate result is obtained.

In Sakharov, it is described that for generation and detection of the Lamb waves, the acoustic transducers were attached to acoustic wedges made of polyurethane. The acoustic transducer would generate a bulk longitudinal wave, which would then be transformed into Lamb waves by the polyurethane wedge. The wedge angle θ between the surface of the vessel wall and the direction of the emitted and received Lamb wave is chosen so as to satisfy the condition $\cos \theta = v_B/v_L$, where $v_B$ is the velocity of bulk longitudinal waves in the wedge, and $v_L$ is the speed of Lamb waves in the vessel wall.

It is an object of the present invention to provide an alternative method and an alternative system for non-intrusive and continuous measurement of the height of a liquid surface in a horizontally lying, cylindrical vessel.

This object is achieved by a system and a method according to the independent claims.

As is known from the above described art, the system comprises an ultrasonic transducer mounted at the outside of the vessel wall for generating an ultrasound wave and for emitting it into the vessel wall; and at least one electronic control and data processing unit for controlling operation of the transducer and for determining the liquid level from a time of flight of the ultrasound wave.

According to the invention, the transducer is a frequency-tunable transducer which is arranged to emit the ultrasound wave as a primary Lamb wave into the vessel wall so that a part of the primary Lamb wave leaks from the vessel wall into the liquid in form of a pressure wave. The at least one electronic control and data processing unit is adapted to change the ultrasonic frequency of the transducer until the transducer receives a reflection of the emitted ultrasound wave in form of a reflection of the pressure wave, determine the corresponding time of flight, and determine the liquid level from the time of flight and from a corresponding and predetermined travel length of the emitted and reflected ultrasound wave, taking into account a predetermined speed of sound in the wall, a predetermined speed of sound in the liquid, a geometric dimension of the cross section of the vessel and the fact that the travel length must include a passage where the pressure wave is reflected by the vessel wall in a perpendicular upward direction to the surface of the liquid From the above, it can be understood that the term "time of flight" relates to the time which elapses between emission and reception of a signal, where in this particular application the "time of flight" means the time elapsing between emission of the primary Lamb wave from the transducer and reception of the reflected pressure wave by the same transducer.

The geometric dimension of the cross section of the vessel may for example be the radius, diameter or perimeter of the cross section of the vessel's cylinder.

The term "transducer" relates to a device into which a transmitter and a receiver are integrated.

Further, it is to be noted that the at least one electronic control and data processing unit of the proposed system is adapted to perform all the steps described in the following for obtaining the measurements and for determining the various magnitudes which it then uses for generating, as an output result, the liquid level in the horizontally lying, cylindrical vessel. The at least one electronic control and data processing unit may be integrated in the same housing with transducer x1, or it may be arranged externally from transducer x1 and connected to it via a wireless or a cable connection.

Expressed differently, the system according to the invention uses an acoustic transmitter/receiver sensor in the following way: An ultrasound signal is excited in the wall of a horizontally lying, cylindrical tank or vessel by an ultrasonic transducer, which transducer may be for example a piezo-electric transducer or an electromagnetic acoustic transducer (EMAT). The transducer is placed at the outside of the vessel wall, somewhere above the maximum filling level of the vessel or specifically directly on top of the vessel. Lamb waves are excited in the tank or vessel wall and travel in the wall towards the liquid/gas interface. The transducer is frequency tunable for changing the speed of sound of the initial Lamb wave. This frequency is chosen such that the acoustic energy is radiated efficiently into the liquid and that the beam is reflected straight up to the surface of the liquid. In this configuration, the reflected beam will travel back to the transducer on the same path and the filling level can be determined by measuring the time of flight of the pulse.

With the proposed system and method, the liquid level in a horizontally lying, cylindrical vessel can be determined without needing to place a transmitter or transducer under the bottom of the vessel, i.e. without having to have access to the bottom of the vessel. In addition, since it is a non-intrusive approach, the measurements can be performed also for liquids where direct contact with them needs to be avoided. In other words, the solution is safer, the inside of the vessel may be cleaned more easily, and the measurement system is easier to install and to replace.

Figure 3:
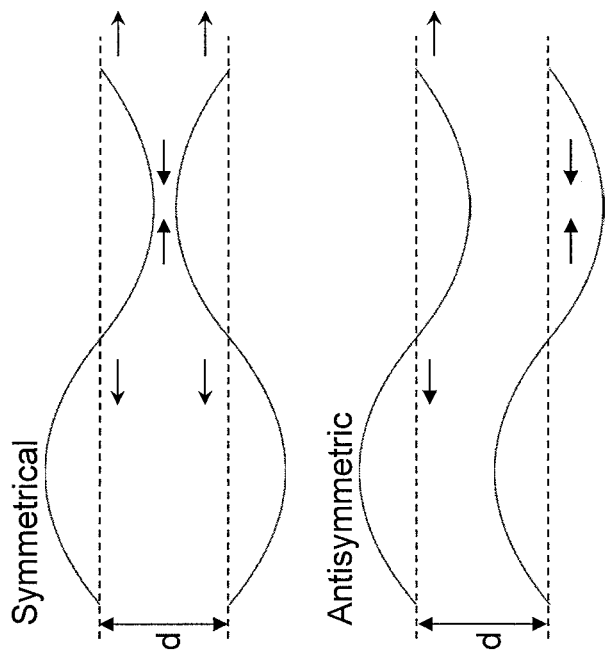
Figure 5:
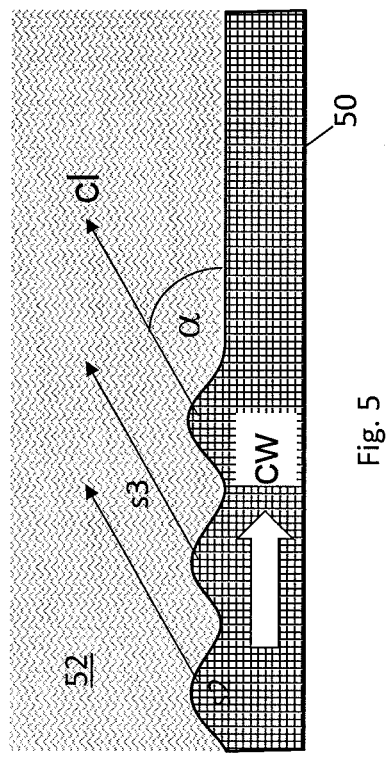

Based on the above described general idea, different embodiments are suggested which are discussed in the following in connection with the examples shown in the appended drawings. The drawings illustrate:

FIG. 1 a side view of a previously known set-up for level measurement in a vessel, including the measurement of the speed of sound in a liquid;

FIG. 2 a first embodiment for level measurement in a cylindrical tank;

FIG. 3 a second embodiment for level measurement in a cylindrical tank;

FIG. 4 a schematic behavior of the two zero-order modes of a Lamb wave;

FIG. 5 a leaky Lamb wave traveling in a wall; and

Figure 6:
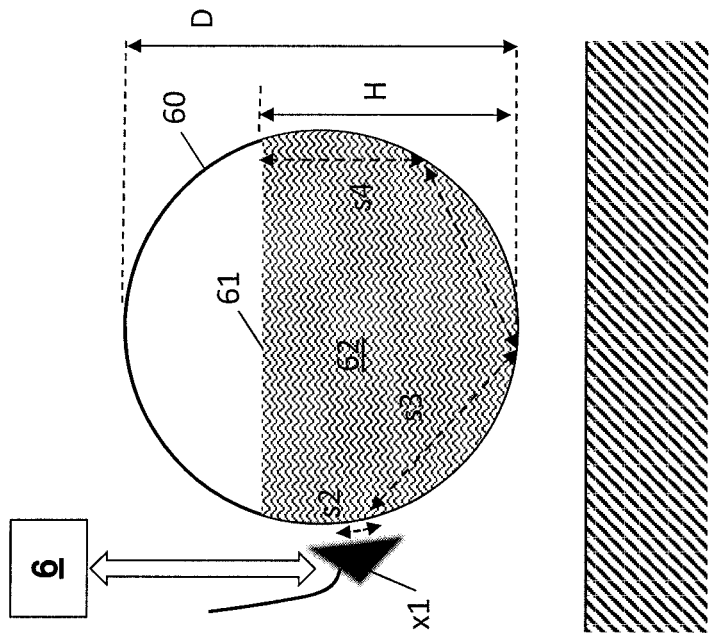

FIG. 6 a third embodiment for level measurement in a cylindrical tank.

FIG. 2 shows a first embodiment for level measurement in a horizontally lying, cylindrical vessel 20. The vessel 20 contains a liquid 22, up to a filling level or liquid level H. The interface between liquid 22 and air or another gas above the liquid 22 is called level interface 21. A frequency-tunable transducer x1 is placed at the outside of the wall of the vessel 20, and in this example directly on top of the vessel 20. Transducer x1 contains an ultrasonic transmitter as well as an ultrasonic receiver.

The transducer x1 is arranged to emit an ultrasound wave as a primary Lamb wave (s1, s2) into the vessel wall so that a part of the primary Lamb wave leaks from the vessel wall into the liquid in form of a pressure wave s3, s4. At least one electronic control and data processing unit 6 is adapted to change the ultrasonic frequency f of the transducer x1 until the transducer receives a reflection of the emitted ultrasound wave in form of a reflection of the pressure wave s3, s4; to determine the corresponding time of flight, and to determine the liquid level H from the time of flight and from a corresponding and predetermined travel length of the emitted and reflected ultrasound wave, taking into account a pre-determined speed of sound in the wall, a predetermined speed of sound in the liquid, a geometric dimension of the cross section of the vessel and the fact that the travel length must include a passage where the pressure wave s3, s4 is reflected by the vessel wall in a perpendicular upward direction (s4) to the surface of the liquid (level interface 21).

The transducer x1 is a piezo-electric transducer or an electromagnetic acoustic transducer (EMAT).

As explained above, the Lamb wave s1 emitted by transducer x1 is a mechanical wave which propagates in different modes with different properties, in particular different propagation velocities as well as different attenuations. Typically at low frequencies, a symmetric S0 and an asymmetric or antisymmetric A0 mode can occur, as is depicted in FIG. 4 for a vessel wall with a thickness d. Ideally, the waves are reflected totally at the sides of the wall and are thus kept inside the wall, as is the case for FIG. 4. This is valid in a first approximation for walls surrounded by a gaseous medium or in vacuum.

When the vessel wall is in contact with a liquid, the reflectivity of the wall interface is reduced and the Lamb wave can emit acoustic energy into the surrounding liquid medium. This occurs especially for the asymmetric mode A0 at low frequencies. Due to the emitting of acoustic energy into the surrounding medium, these waves are also called leaky Lamb waves, as shown in FIG. 5, where a wall 50 is in contact with a liquid 52.

Accordingly, the zero-order asymmetric mode A0 is a good choice for above described level measurement purposes since it ensures an efficient radiation of acoustic energy into the liquid over a broad range of frequencies. Apart from that, the propagation speed of the A0-mode is strongly frequency dependent. But also other modes can be used if they have these same properties.

By changing the frequency of the excitation of the transducer x1, the direction of the emitted pressure wave s3 in the liquid 22 can be altered based on the frequency-dependent phase velocity of the leaky Lamb mode. As can be seen from FIG. 5, the direction of the beam is given by $$\cos(\alpha)=c\_L/(c\_W(f)), \quad (2)$$

where $\alpha$ is the angle between the wall 50 and the pressure wave s3, c_L is the speed of sound in the liquid 52 and c_W (f) is the frequency-dependent phase velocity of the Lamb wave s2 in the wall.

During the measurement procedure of FIG. 2, the exciting frequency of transducer x1 is varied, until the last reflection s4 before reaching the level interface 21 is sent out perpendicular to the liquid surface (level interface 21). Only then, a signal can travel back along the same path s4→s3→s2→s1. It is preferably to arrange transducer x1 in such a way that the reception of signals reaching the integrated receiver from the backside is blocked. The time of flight of the ultrasonic signal is measured between emission of Lamb wave s1 by transducer x1 and reception of the reflection of pressure wave s4 by transducer x1. Based on the time of flight, the filling or liquid level H in the vessel 20 can be determined, by further taking into account the speed of sound in the wall of vessel 20, the speed of sound in the liquid 22 as well as the radius of the vessel 20. The latter three parameters need to be predetermined.

The travel time or time of flight of the reflected pulse (s4) consists of the times of flight for the different parts of the travel distance.

The first part corresponds to the propagation of the primary Lamb wave s1 in the dry or non-wetted part of the wall of vessel 20:

$$t1=d1/cw, \quad (3)$$

with d1 being the propagation distance in the non-wetted part of the wall and cw the propagation speed (speed of sound) of the primary Lamb wave s1 in the wall.

The distance d1 depends on the exact location of the transducer x1. For a transducer mounted exactly on the top it is given by $$d1=D/2*\arccos(2H/D-11) \quad (4)$$

In FIG. 3, transducer x1 is placed outside of the wall of vessel 30 at a position above the maximum filling level of the vessel 30, but below the top of the horizontally lying vessel. For such a lower position of transducer x1 (compared to FIG. 2), the distance d1 would be calculated based on equation (4), where the distance of the position of transducer x1 from the top position has to be subtracted accordingly.

The second part of the time of flight corresponds to the propagation of the primary Lamb wave s2 in the wetted part of the wall of vessel 30:

$$t2=s2/cw, \quad (5)$$

with d2 being the propagation distance in the wetted part of the wall until the sound (pressure wave s3) is radiated into the liquid 22. This distance d2 is given by the propagation mode, the wall geometry and the liquid properties and is normally constant for a certain setup.

The third part of the time of flight corresponds to the propagation of the emitted sound (pressure wave s3) in the liquid:

$$t3=n*d3/cl=n*D*\sin(alpha)/cl \quad (6)$$

with d3=D*sin(alpha) being the propagation distance of the emitted sound (pressure wave s3) up to the next reflection, cl being the propagation speed (speed of sound) in the liquid and n being the number of reflection respective the number of segments until the sound is reflected upwards towards the level interface 21. D is the diameter of the cylinder of the vessel 20 and alpha is the emitting angle relative to the tangent of the wall. The angle alpha as defined above is determined by the two given propagation speeds.

The fourth part of the time of flight corresponds to the propagation of pressure wave s4, i.e. to the propagation of the reflection of pressure wave s3 upwards towards the level interface 21:

$$t4=d4/cl \quad (7)$$

with s4=H−D/2+D/2*cos(2*(d1+d2)/D+2*n*alpha) being the propagation distance from the last reflection upwards to the level interface 21.

The overall time of flight or travel time up to the reflection at the level interface 21 and back towards transducer 21 is given by the sum of the above described individual parts of the time of flight, multiplied by two:

$$t=2*(t1+t2+t3+t4) \quad (8)$$

from which the level H can be calculated reversely.

The parameters D, alpha, d2, cl and cw are given by the setup and are to be predetermined, e.g. calibrated. The parameters alpha and d2 depend on the properties of the used Lamb mode and the speeds of sound, and can therefore also be determined out of the frequencies and the wall characteristics.

The number n of reflections at the wall, depends on the actual filling level H and the emitting angle alpha. It can be checked by plausibility checks as e.g. by calculating the level H with different numbers of n and checking which of the resulting level H is reasonable. For a certain level H and a certain angle alpha there exists only one valid to number of n.

In case the transducer x1 is not mounted on the top of the vessel (see FIG. 3), the travelled path distance has to be adapted accordingly by either reducing (as in FIG. 3) or neglecting the path d1.

In case that the transducer x1 is mounted below the liquid level, as is shown in FIG. 6, the travelled path distance has to be adapted by neglecting path d1 and reducing path d2. In other setups, it may also be required to reduce the number of reflections for the leaked pressure wave s3.

According to equation (2), the frequency f and thus the propagation speed cw(f) has to be chosen such that an emitting angle alpha is generated to get the described propagation path. For this propagation path, the emitting angle alpha has to fulfil the condition $$alpha=(pi+arcos(1-2H/D)-d2/D)/(2n+1) \quad (9)$$

In practical applications, the pressure wave s3 would not be emitted at a very precise angle alpha. Instead, The pressure wave s3, which may also be regarded as a sound beam, would have a certain opening angle and thus the sound would be emitted at a certain range of different angles and not only at a single one.

Therefore, the emitting angle does not need to be set exactly at the angle described by the above condition (9), instead the above angle has only to be contained in the emitted range of angles. But the received signal, i.e. the reflection of the pressure wave s3, s4, will then have traveled a path according to the above angle (9). This angle can then be used for the calculation of the travel time and the liquid level, respectively.

For a practical level measurement therefore, an ultrasonic signal at a first frequency is generated which would result in a corresponding emitting angle alpha. The signal is recorded and the time of flight of the reflection determined. From the time of flight the corresponding liquid level H is determined according to equations (3)-(8) for different numbers of reflections. The different determined levels H are then checked for plausibility, e.g. if it is 0<=H<=D or n<(t_meas−t2)/(D*sin(alpha))*cl, with t_meas being the measured travel time. In case no reflected signal occurs in the expected period of time or in case no plausible level H can be determined, the next frequency resulting in a next respective emitting angle alpha is tested.

The invention claimed is:

1. System for non-intrusive and continuous level measurement of a liquid, where the liquid is enclosed by a solid wall of a horizontally lying, cylindrical vessel, the system comprising
   an ultrasonic transducer mounted at the outside of the vessel wall for generating an ultrasound wave and for emitting it into the vessel wall, and
   at least one electronic control and data processing unit for controlling operation of the transducer and for determining the liquid level from a time of flight of the ultrasound wave, wherein
   the transducer is a frequency-tunable transducer which is arranged to emit the ultrasound wave as a primary Lamb wave into the vessel wall so that a part of the primary Lamb wave leaks from the vessel wall into the liquid to form a pressure wave in the liquid, the pressure wave in the liquid being reflected at least once by the vessel wall,
   the at least one electronic control and data processing unit is adapted to change the ultrasonic frequency of the transducer until a last reflection of the pressure wave in the liquid before the pressure wave reaches the liquid level is sent out perpendicular to a surface of the liquid level, an ultrasonic signal thereafter reflected back from the surface of the liquid level along a same path as the pressure wave in the liquid and the primary lamb wave in the vessel wall, and the transducer receives the ultrasonic signal, determine the corresponding time of flight, and determine the liquid level from the time of flight.

2. System according to claim 1, wherein the transducer is a piezo-electric transducer or an electromagnetic acoustic transducer.

3. System according to claim 2, wherein the transducer is placed at the outside of the vessel wall above a maximum filling level of the vessel.

4. System according to claim 2, wherein the transducer is arranged to receive a zero-order asymmetric mode of the primary Lamb wave.

5. System according to claim 2, wherein the transducer is arranged in such a way that the reception of signals reaching the transducer from the backside is blocked.

6. System according to claim 2, wherein the at least one electronic control and data processing unit is adapted to detect whether the reflection received by the transducer is indeed a reflection of the pressure wave by checking whether the determined liquid level is plausible, in the sense that whether the liquid level has a value in the range between zero and the diameter of the cross section of the cylindrical vessel.

7. System according to claim 1, wherein the transducer is placed at the outside of the vessel wall above a maximum filling level of the vessel.

8. System according to claim 7, wherein the transducer is arranged to receive a zero-order asymmetric mode of the primary Lamb wave.

9. System according to claim 7, wherein the transducer is arranged in such a way that the reception of signals reaching the transducer from the backside is blocked.

10. System according to claim 1, wherein the transducer is arranged to receive a zero-order asymmetric mode of the primary Lamb wave.

11. System according to claim 10, wherein the transducer is arranged in such a way that the reception of signals reaching the transducer from the backside is blocked.

12. System according to claim 1, wherein the transducer is arranged in such a way that the reception of signals reaching the transducer from the backside is blocked.

13. System according to claim 1, wherein the at least one electronic control and data processing unit is adapted to detect whether the reflection received by the transducer is indeed a reflection of the pressure wave by checking whether the determined liquid level is plausible, in the sense that whether the liquid level has a value in the range between zero and the diameter of the cross section of the cylindrical vessel.

14. Method for non-intrusive and continuous level measurement of a liquid, where the liquid is enclosed by a solid wall of a horizontally lying, cylindrical vessel, comprising the steps generating an ultrasound wave by an ultrasonic transducer mounted at the outside of the vessel wall and emitting the ultrasound wave into the vessel wall, and controlling operation of the transducer and determining the liquid level from a time of flight of the ultrasound wave by at least one electronic control and data processing unit, wherein emitting the ultrasound wave as a primary Lamb wave into the vessel wall so that a part of the primary Lamb wave leaks from the vessel wall into the liquid to form a pressure wave in the liquid, the pressure wave in the liquid being reflected at least once by the vessel wall, via the at least one electronic control and data processing unit: changing the ultrasonic frequency of the transducer until a last reflection of the pressure wave in the liquid before the pressure wave reaches the liquid level is sent out perpendicular to a surface of the liquid level, an ultrasonic signal thereafter reflected back from the surface of the liquid level along a same path as the pressure wave in the liquid and the primary lamb wave in the vessel wall, and the transducer receives the ultrasonic signal, determining the corresponding time of flight from the primary lamb wave in the vessel wall, the pressure wave in the liquid, and the ultrasonic signal, and determining the liquid level from the time of flight.

\* \* \* \* \*